(12) United States Patent
Nowland

(10) Patent No.: US 9,555,481 B2
(45) Date of Patent: Jan. 31, 2017

(54) PORTABLE DRILL PRESS

(71) Applicant: Claude Ernest Nowland, Gracemere (AU)

(72) Inventor: Claude Ernest Nowland, Gracemere (AU)

( * ) Notice: Subject to any disclaimer, the term of this patent is extended or adjusted under 35 U.S.C. 154(b) by 82 days.

(21) Appl. No.: 14/387,201

(22) PCT Filed: Mar. 23, 2013

(86) PCT No.: PCT/AU2013/000295
§ 371 (c)(1),
(2) Date: Sep. 22, 2014

(87) PCT Pub. No.: WO2013/138865
PCT Pub. Date: Sep. 26, 2013

(65) Prior Publication Data
US 2015/0030403 A1    Jan. 29, 2015

(30) Foreign Application Priority Data
Mar. 23, 2012  (AU) ................. 2012100325

(51) Int. Cl.
*B23B 45/00* (2006.01)
*B23B 39/00* (2006.01)
*B25H 1/10* (2006.01)
*B25H 1/00* (2006.01)
*B23B 47/26* (2006.01)

(52) U.S. Cl.
CPC ............ *B23B 39/006* (2013.01); *B23B 45/00* (2013.01); *B23B 47/26* (2013.01); *B25H 1/0064* (2013.01); *B25H 1/10* (2013.01); *B23B 2270/08* (2013.01); *Y10T 408/554* (2015.01); *Y10T 408/564* (2015.01); *Y10T 408/5627* (2015.01); *Y10T 408/5635* (2015.01); *Y10T 408/5647* (2015.01); *Y10T 408/5653* (2015.01); *Y10T 408/6779* (2015.01)

(58) Field of Classification Search
CPC ... B25H 1/0021; B25H 1/0057; B25H 1/0064; B23B 45/14; Y10T 408/564; Y10T 408/5647; Y10T 408/5653; Y10T 408/554; Y10T 408/5635; Y10T 408/6779
USPC .......................................... 408/706
See application file for complete search history.

(56) References Cited

U.S. PATENT DOCUMENTS

| 895,647 | A | * | 8/1908 | Lang ............... | B23B 35/005 |
| | | | | | 269/249 |
| 2,637,225 | A | * | 5/1953 | Benbow ........... | B25H 1/0057 |
| | | | | | 192/46 |
| 2,737,065 | A | | 3/1956 | Piersall | |
| 2,849,900 | A | * | 9/1958 | Heidtman, Jr. .... | B25H 1/0078 |
| | | | | | 408/112 |

(Continued)

FOREIGN PATENT DOCUMENTS

| GB | 365234 | 1/1932 |
| GB | 2132546 | 7/1984 |

*Primary Examiner* — Daniel Howell
*Assistant Examiner* — Yasir Diab

(57) ABSTRACT

A drill press comprises a hollow pillar with a base, a holder for a drill slidably mounted on the pillar and a clamp integral to the pillar for clamping the base to a work piece so that the drill is guided to the work piece. The clamp is a G clamp with a jaw held by an arm which engages a screw thread shaft housed in the pillar so that rotating the shaft raises and lowers the arm and the jaw.

20 Claims, 18 Drawing Sheets

(56) References Cited

U.S. PATENT DOCUMENTS

| | | | | |
|---|---|---|---|---|
| 2,973,673 A | * | 3/1961 | Grau | B25H 1/0064 |
| | | | | 408/712 |
| 3,060,769 A | * | 10/1962 | Heider | B25H 1/0064 |
| | | | | 192/107 T |
| 3,538,794 A | * | 11/1970 | Grundmeyer | B25H 1/0057 |
| | | | | 408/92 |
| 3,784,315 A | * | 1/1974 | O'Brien | B25H 1/0057 |
| | | | | 173/32 |
| 3,847,501 A | * | 11/1974 | Doty | F16L 41/04 |
| | | | | 408/101 |
| 4,494,895 A | | 1/1985 | Leaf | |
| 4,541,759 A | * | 9/1985 | Miyoshi | B25H 1/0071 |
| | | | | 408/241 G |
| 5,051,044 A | * | 9/1991 | Allen | B25H 1/0064 |
| | | | | 33/371 |
| 5,660,508 A | | 8/1997 | Schneider | |
| 5,713,702 A | * | 2/1998 | Turner | B23B 41/006 |
| | | | | 408/100 |
| 6,050,753 A | * | 4/2000 | Turner | B25H 1/0064 |
| | | | | 408/712 |
| 6,729,809 B2 | * | 5/2004 | Sarh | B23B 47/28 |
| | | | | 408/1 R |
| 2003/0143041 A1 | | 7/2003 | Soderman | |

* cited by examiner

PORTABLE DRILL PRESS

FIELD OF INVENTION

This invention relates to devices for facilitating the use of a drill and in particular drill presses which can be attached to a work piece on site.

BACKGROUND OF THE INVENTION

It should be noted that reference to the prior art herein is not to be taken as an acknowledgement that such prior art constitutes common general knowledge in the art.

Drill presses are normally permanently and rigidly mounted on a bench so that the work piece to be drilled has to be taken to the bench. Accordingly they are of no use when the work piece is too large to fit on the bench or it is not convenient to transport it to the bench. For this reason there have been a number of attempts at devising a portable drill press which can be used on site.

US 20030143041 teaches a rack bar with a brace attached at one end and a pinion slide assembly engaged with the rack bar such that the pinion is in rotational engagement with the rack. A hand drill is mounted on a bracket attached to the pinion slide assembly and the brace is held or clamped to the work piece.

U.S. Pat. No. 2,737,065 teaches a similar device which is also held or clamped to the work piece being drilled while a rack and pinion assembly urge a drill mounted on the pinion towards the work piece. A collar separate from the drill mount is urged by operation of a lever against the upper end of the drill mount to move the drill toward the base.

However neither of these prior art devices operate in the manner of a drill press which is permanently mounted on a bench since they have to be held against the work piece by the operator or a separate clamp has to be used.

This does not allow for accuracy nor ease of drilling especially when the work piece has to be addressed from below as in the case of roof beams.

Clearly it would be advantageous if a portable drill press could be devised that helped to at least ameliorate some of the shortcomings described above. In particular it would be advantageous if a portable drill press could be devised which improves the ease and accuracy of drilling or at least provides a useful alternative to the prior art devices.

STATEMENT OF THE INVENTION

According to a first aspect, the present invention provides a drill press comprising a hollow pillar with a base, a holder for a drill slidably mounted on the pillar and a clamp with a jaw held by an arm which engages a screw thread shaft housed in the pillar so that rotating the shaft raises and lowers the arm and the jaw, wherein the clamp is used for clamping the base to a work piece so that the drill is guided to the work piece.

Preferably, the clamp is an F clamp, a G clamp or a C clamp.

Preferably, the drill press may further comprise a pinion rotatable by a lever, the pinion is pivoted in a housing and engages a rack formed on an outer surface of the pillar so that rotating the lever urges the drill vertically towards or away from the work piece.

Preferably, the drill press may further comprise a spring located on either side of the arm to restrain movement of the jaw. Alternatively, the spring may be located on one side of the arm to restrain movement of the jaw.

Preferably, the arm may have an internal thread which engages the screw thread shaft located within the pillar of the drill press. The arm may protrude through an opening in one side of the pillar, the opening being of sufficient size to allow the arm to move up or down to secure or release the clamp with a jaw to a work piece.

Preferably, the opening in the pillar may allow the clamp with a jaw to rotate through an arc located either side of an axis passing vertically through the centre of the pillar. Alternatively, the pillar may further comprise an opening which allows the clamp with a jaw to rotate through an arc of 180 degrees with respect to an axis passing vertically through the centre of the pillar.

Preferably, the clamp with a jaw may be withdrawn upwards into the pillar through a slot in the base so that the base can sit flush on a surface.

Preferably, the screw thread shaft may be rotated by a handle attached to the top of the shaft which protrudes at the top of the pillar to allow the arm to move up and down to secure the clamp with a jaw to a work piece.

Preferably, the pinion and rack may be both located within the housing with the housing being attached to at least one side of the pillar, at least one lever extending externally of the housing to engage and rotate the pinion to move the holder for the drill and therefore the drill vertically towards and away from the work piece.

Preferably, the drill may comprise any one of: (1) an electric drill; (ii) a pneumatic drill; (iii) a hydraulic drill or (iv) an electromagnetic drill. The electromagnetic drill may be either mounted using the electromagnet to the base of the drill press or the electromagnetic drill may be mounted to the housing attached to at least one side of the pillar.

Preferably, the drill press may comprise: at least two hollow pillars mounted on a base; at least two holders slidably mounted on the pillars, at least one holder containing a drill; at least two clamps each with a jaw held by an arm which engage a screw thread shaft housed in each of the pillars so that rotating the shaft raises and lowers the arm and the jaw independently within each pillar; and wherein each clamp is used for clamping the base to a work piece. The other holder mounted on the pillar may contain any one of: (i) a drill; or (ii) a drop saw.

Preferably, the base may be adapted to hold any one or combination of: (i) a vise; (ii) a tool box; (iii) temporary lighting; (iv) a television; or (v) a work bench.

Preferably, the base of the drill press may further include an opening in the base which allows the drill to pass through the opening and drill into the work piece clamped to the base of the drill press.

Preferably, to compress the spring and to allow the clamp with a jaw to move in and out relative to the base of the drill press, plates may be provided protruding and extending from either side of the arm a distance which is sufficient to allow the fingers of the user's hand to be comfortably placed under the plates, and with the user's thumb placed on a top end of the clamp with a jaw to compress the spring.

Preferably, a further clamp may be added to secure the drill press to a work piece, wherein the clamp is either a G clamp or an F clamp.

Preferably, the jaw of the clamp may further comprise brackets mounted to an end of the jaw to facilitate the attachment of the jaw of the clamp to a pipe or cylindrical work piece. The base of the drill press may comprise brackets attached to the underside of the base to facilitate the clamping of the base to a pipe or cylindrical work piece.

Preferably, the at least two pillars and clamps may further comprise a bridge or saddle located between and joining the at least two pillars and clamps.

DETAILED DESCRIPTION OF THE INVENTION

Figure 1:
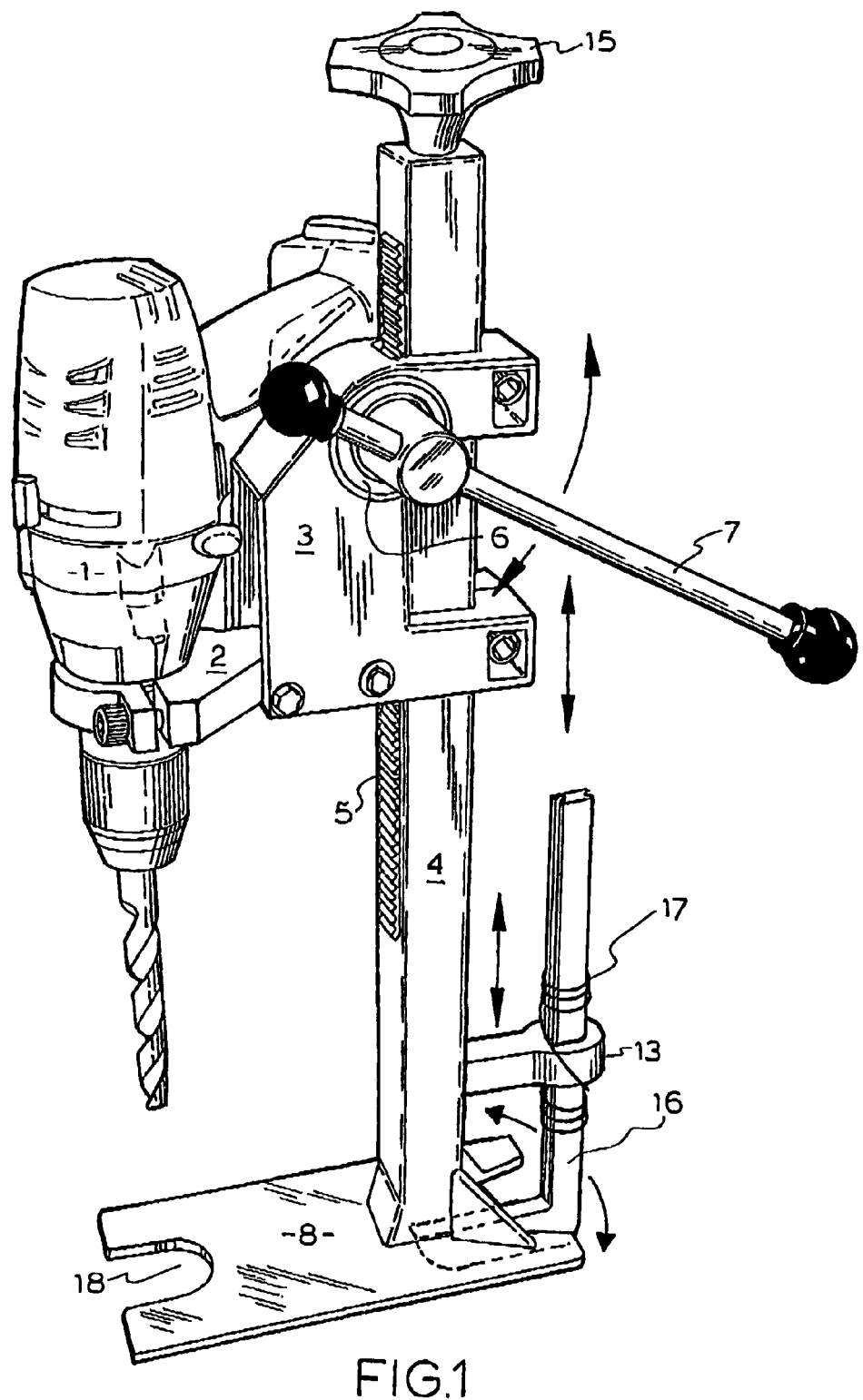
FIG. 1 illustrates a perspective view of a portable drill press incorporating a clamp in accordance with an embodiment of the present invention.
Figure 2:
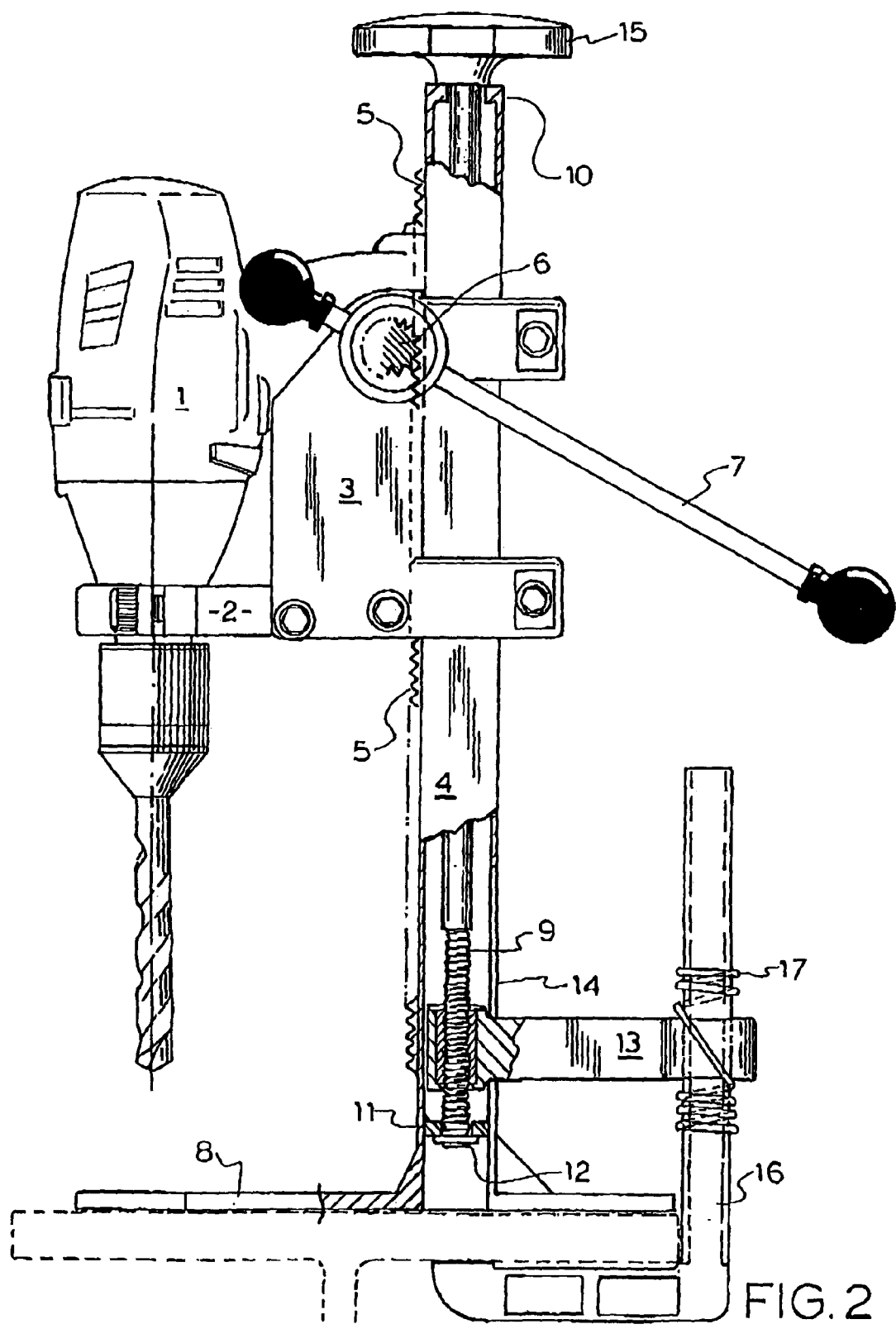
FIG. 2 shows a side elevation of the press of FIG. 1 with sections cut-away to expose the operation of the press.

In the drill press shown in FIG. 1, hand drill 1 is securely mounted by bracket 2 to housing 3 which is in sliding engagement with pillar 4 made from a hollow rectangular tube. Pillar 4 has rack 5 formed in its outer surface facing drill 1 and mating pinion 6 is pivoted in housing 3 and rotatable by lever 7.

A drill press (also known as a pedestal drill, pillar drill, or bench drill) is a fixed style of drill that may be mounted on a stand or bolted to the floor or workbench. Portable models with a magnetic base grip the steel work pieces they drill. A drill press consists of a base 8, column (or pillar) 4, and drill 1 with a drill head and chuck. The drill 1 is typically driven by an induction motor. The drill press has a handle 7 or a set of handles (usually 3) radiating from the housing or central hub 3 that, when turned, move the drill 1 and chuck vertically, parallel to the axis of the pillar 4. As stated above the pillar 4 has a rack 5 and the mating pinion 6 is located in the housing 3 which in conjunction with the handle 7 move the drill and chuck vertically.

A rack 5 and pinion 6 is a type of linear actuator that comprises a pair of gears which convert rotational motion into linear motion. A circular gear or the pinion 6 engages teeth on a linear gear bar or rack 5. Rotational motion applied to the pinion 6 causes the housing 3 to move, thereby translating the rotational motion of the pinion 6 into the linear motion of the housing 3.

The size of a drill press is typically measured in terms of swing. Swing is defined as twice the throat distance, which is the distance from the center of the spindle to the closest edge of the pillar 4.

The hand drill or simply drill 1 is a tool fitted with a cutting tool attachment or driving tool attachment, usually a drill bit or driver bit, used for drilling holes in various materials. The attachment is gripped by a chuck at one end of the drill 1 and rotated while being pressed against the material to be drilled.

There are many types of powered drills 1 some are powered using electricity (electric drill), compressed air (pneumatic drill) or a compressed liquid (hydraulic drill) as the motive power. Another type of powered drill is the electromagnetic drill press which uses an electromagnet in the base that allows the drill 1 to attach directly to any metal surface which can be magnetised. The electromagnetic drill 100 is only useful if the work piece to be drilled is able to be easily magnetized. For example metals which are ferrous metals such as iron, nickel, cobalt and certain steels are easily magnetised. Whereas, materials such as brass, aluminum, copper, and most stainless steels are not easily magnetised and are therefore called non-ferrous materials.

Therefore the electromagnetic drill 1 is generally used for construction with ferrous metals such as steel. The high-powered magnet in the base clamps the drill 1 tightly to steel preventing the drill from moving.

FIGS. 1 to 4 show the pillar 4 is held vertically on base 8 and extends upward and perpendicular to the base 8. The pillar 4 houses a threaded shaft 9 held loosely by top closure 10 and bottom spacer 11 and retained on spacer 11 by stop 12 as revealed in FIG. 2. The internal end of clamp arm 13 has an internal thread which engages the thread of the shaft 9 through cut out 14 in pillar 4 and moves up and down as handle 15 rotates shaft 9.

The external end of arm 13 receives clamp jaw 16 which is slidably restrained on arm 13 by locating spring 17. The locating spring 17 is located on either side of the arm 13 to restrain movement of the clamp jaw 16. As will be described in more detail below the spring 17 can be placed in a number of different positions to physically restrain the movement of the clamp jaw 16.

Accordingly base 8 can be secured to a work piece (shown in dotted outline) by rotating the handle 15 which in turn rotates the threaded shaft 9 and moves the arm 13 upward so that jaw 16 grips the work piece. Likewise the base can be released from the work piece by rotating the handle 15 in the opposite direction which rotates the threaded shaft 9 in the opposite direction therefore moving the arm 13 away from the work piece.

With the base 8 secured to the work piece the drill 1 can then be urged down on the work piece by rotating lever 7 anticlockwise which moves the drill 1 vertically downward, parallel to the axis of the pillar 4. The drill 1 can then drill the desired hole through cut out 18 (as shown in FIG. 1) in base 8. When completed the drill 1 is withdrawn from the work piece by rotating lever 7 in a clockwise direction which moves the drill 1 vertically upwards away from the work piece.

In this embodiment an F clamp is used to secure the work piece to the base 8. An F-clamp, also known as a speed clamp is a type of clamp which takes its name from its "F" shape. The F-clamp is similar to a C-clamp in use, but has a wider opening capacity (throat). Alternatively in other embodiments a G clamp is used to secure the work piece to the base 8.

Figure 3:
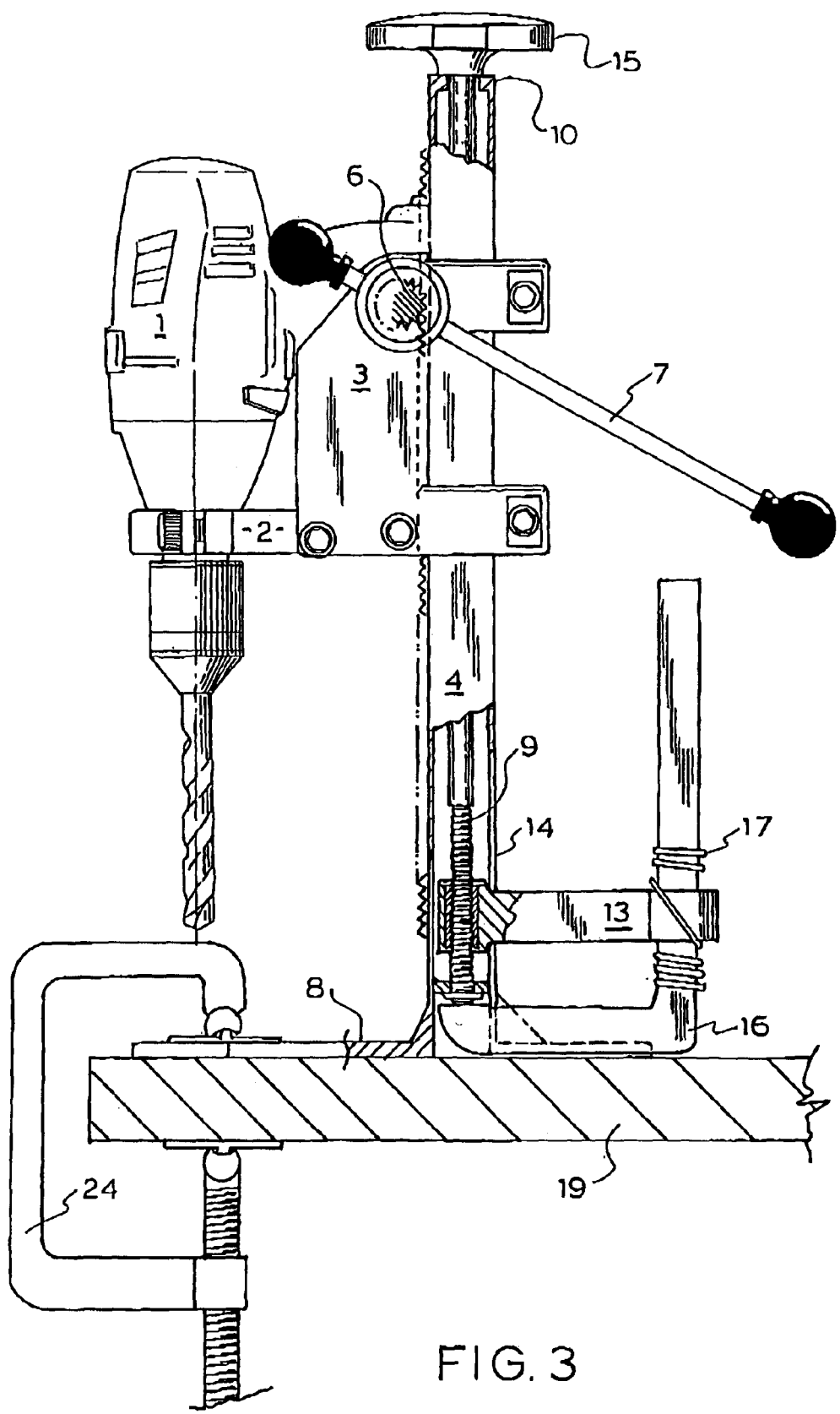
FIG. 3 shows a view of FIG. 2 with the clamp withdrawn upwards for a flush mount operation.

FIG. 3 shows the drill press with jaw 16 withdrawn upwards into pillar 4 so that base 8 can sit unobstructed on the top surface of the work piece 19. In this configuration G clamp 24 is further used to secure base 8 to the top surface of work piece 19.

Figure 4:
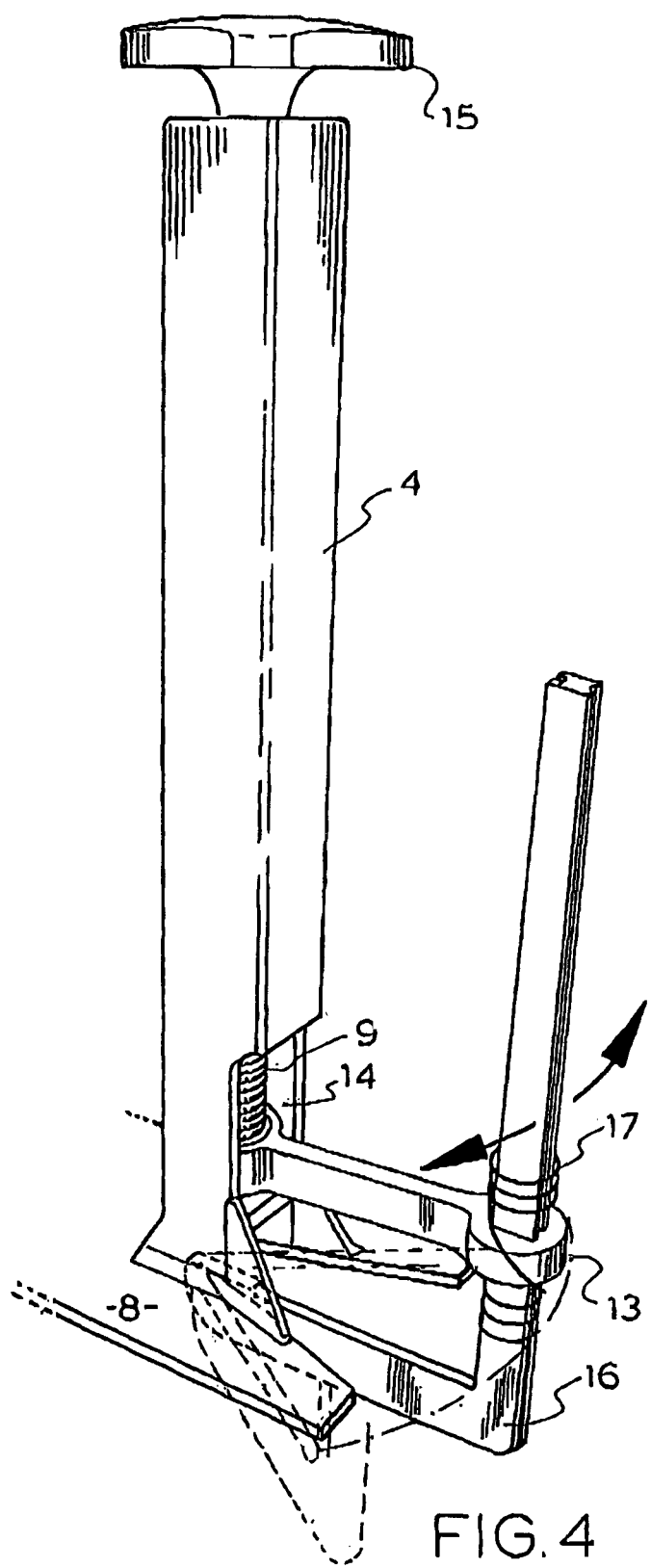
FIG. 4 shows a rear perspective view of the clamp in accordance with an embodiment of the present invention.

FIG. 4 is a rear perspective view showing clamp arm 13 and jaw 16. In normal use the arm 13 is clamped in line with the pillar 4 to a bench or to a job. Due to the cutout 14 in the pillar 4 the arm 13 is able to rotate through an arc as shown by the arrows. This allows the clamp jaw 16 to be rotated a certain distance away from either side of the centre of the pillar 4. This further provides the advantage of being able to move the jaw 16 into a number of positions which is advantageous in some drilling operations when space is limited. As will be discussed below in more detail the cutout 14 may also extend to the sides of the pillar 4 adjacent the cutout 14 so that the jaw 16 may be rotated through 180 degrees with respect to the pillar 4.

Figure 5:
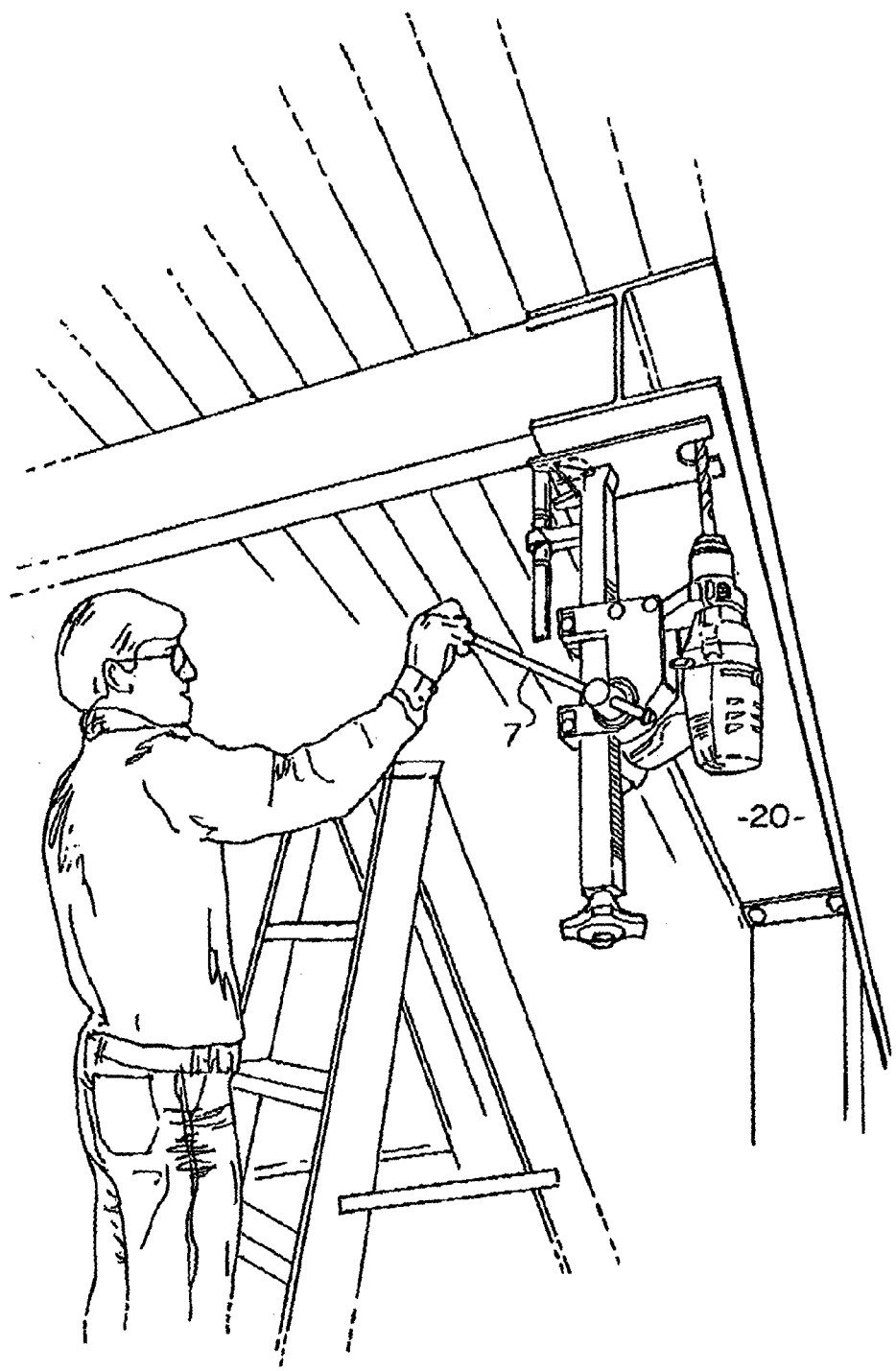
FIG. 5 illustrates a view of the press of FIG. 1 clamped beneath a roof beam in accordance with an embodiment of the present invention.

In FIG. 5 the drill press is shown clamped to roof beam 20 from its underside allowing the operator to use the drill simply by rotating lever or handle 7. By rotating the handle 7 the drill 1 is moved vertically towards the roof beam 20 and a hole is drilled through the cut out 18 into the roof beam 20 while the drill press is securely suspended from the bottom of the roof beam 20.

Figure 6:
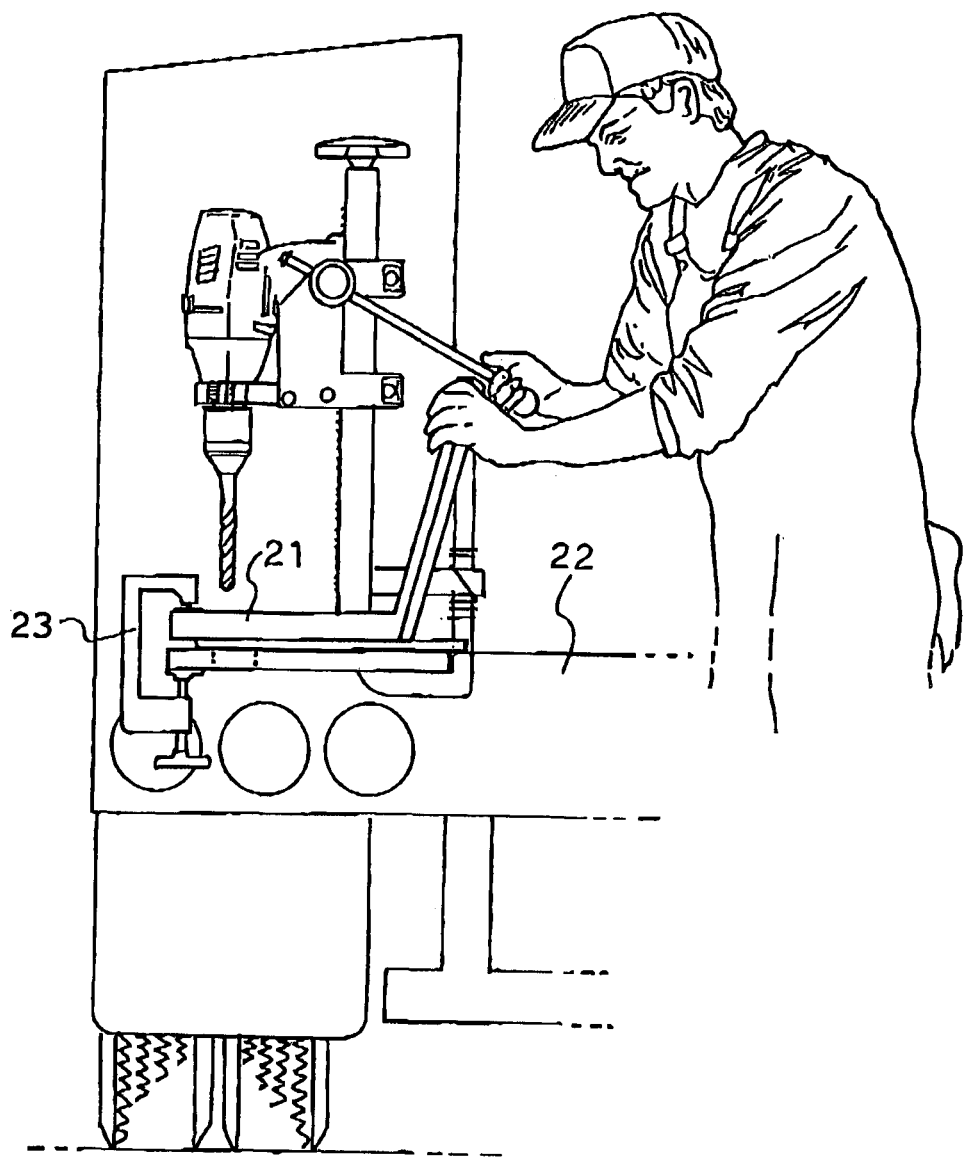
FIG. 6 illustrates a view of the press of FIG. 1 clamped on the rear of a truck deck in accordance with an embodiment of the present invention.

In FIG. 6 the drill press is clamped to the rear of truck deck 22 and G clamp 23 is used to secure work piece 21 to deck 22. It will be apparent that the drill press of the present invention allows both clamped and unclamped operation and facilitates drilling in a wide variety of situations.

Figure 7:
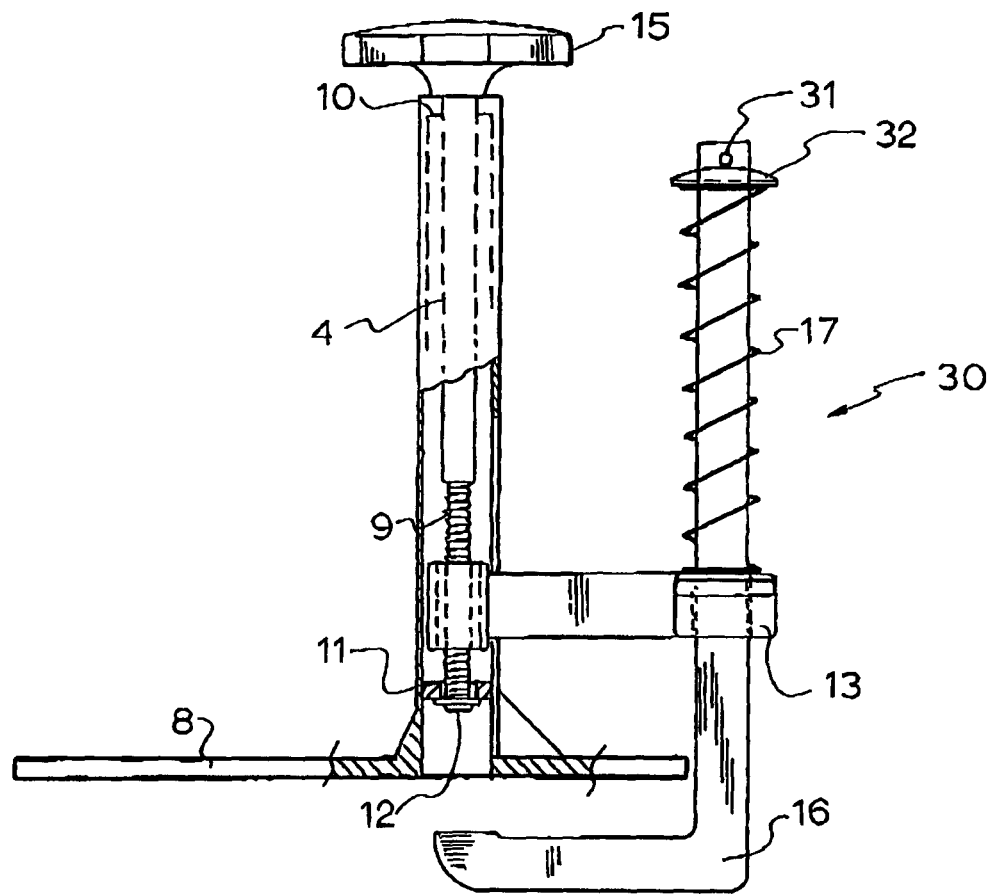
FIG. 7 shows a side view of the clamp in accordance with a further embodiment of the present invention.

FIG. 7 illustrates a side view of a further embodiment of the clamp 30 with the drill press removed for further clarity. To facilitate the description of this embodiment like numbered components used in the earlier embodiment are given the same reference numerals in this embodiment. The clamp 30 includes the pillar 4 held vertically on base 8 and extending upward and perpendicular to the base 8. The pillar 4 houses a threaded shaft 9 held loosely by top closure 10 and bottom spacer 11 and retained on spacer 11 by stop 12. The internal end of clamp arm 13 has an internal thread which engages the thread of the shaft 9. As handle 15 is rotated threaded shaft 9 moves the clamp arm 13 up and down.

The external end of arm 13 receives clamp jaw 16 which is slidably restrained on arm 13 by locating spring 17. The spring 17 is restrained between the top side of the arm 13 and a cap 32 which is secured to the clamp jaw 16 by pin 31. The spring 17 is a compression spring which offers resistance to compressive forces which, when the spring is compressed it exerts a force which is proportional to its change in length.

Figure 8:
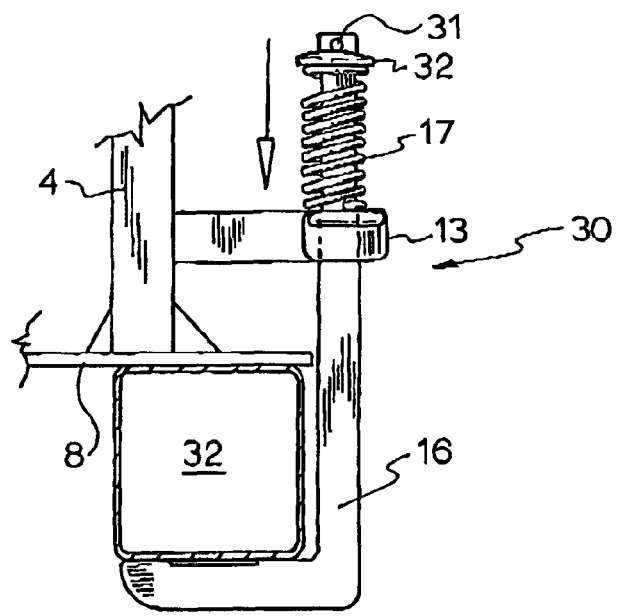
FIG. 8 shows the clamp of FIG. 7 in use clamped to a wide beam.
Figure 9:
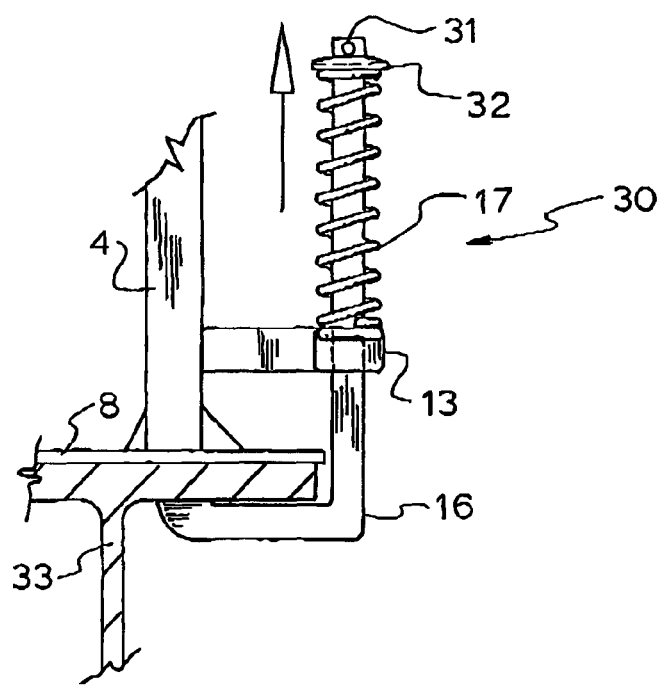
FIG. 9 shows the clamp of FIG. 7 in use clamped to a narrow beam.

FIG. 8 shows the clamp 30 used to clamp the base 8 of the drill press to a post 32. As this item is of significant width the spring 17 is compressed more than previously shown in FIG. 7 to allow the clamp jaw 16 to extend in the direction of the arrow and around the post 32. Likewise and as shown in FIG. 9 an item of less width in which the clamp jaw 16 moves in the direction of the arrow and the spring 17 is compressed less than as shown in FIG. 8.

Figure 10:
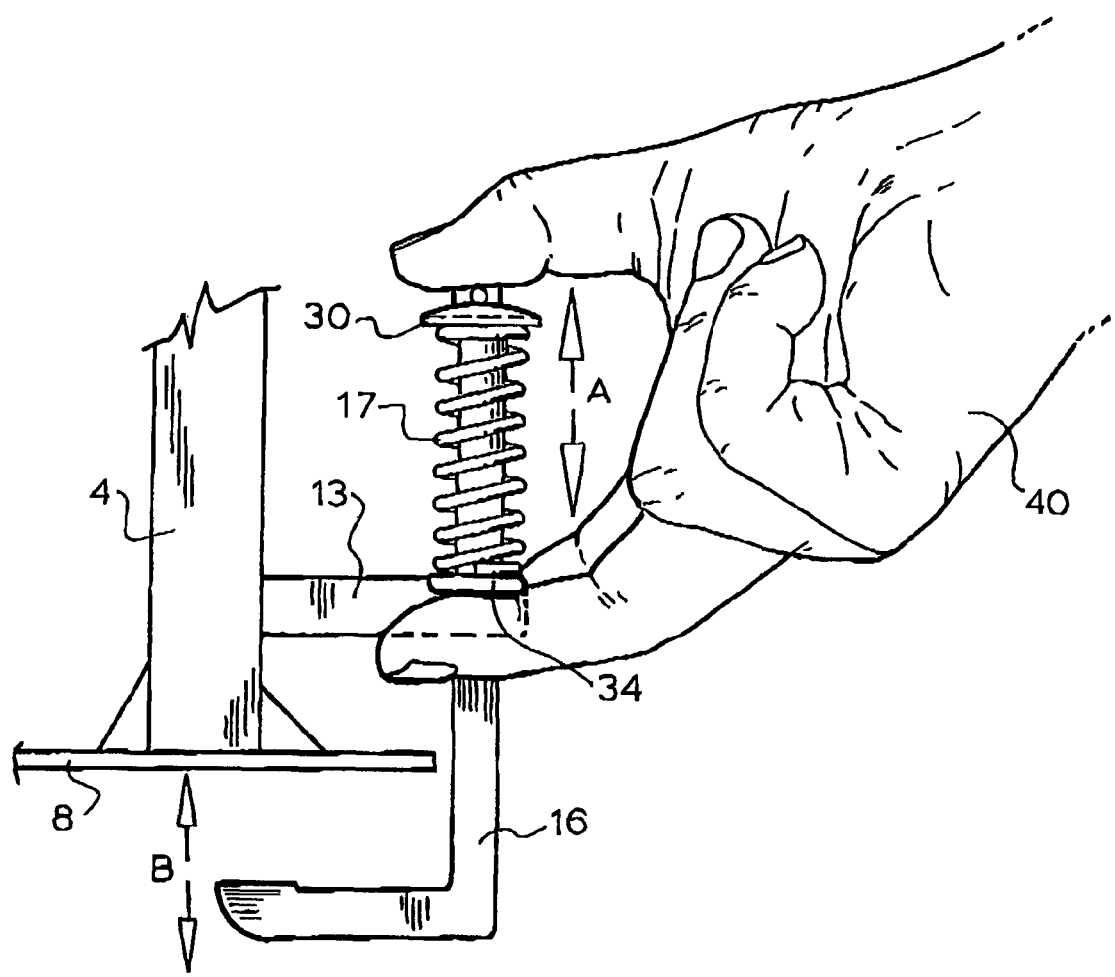
FIG. 10 shows the manual operation of the clamp and clamp spring of FIG. 7 with the spring compressed to open the clamp.

FIG. 10 shows by way of example the manual operation of the spring and the clamp jaw 16. As the spring is manually compressed and released by the fingers of the user hand 40 and as shown by arrow A, the spring will allow the clamp jaw 16 to move in the corresponding direction as indicated by arrow B. As the spring is compressed the arrows A comes closer together and likewise the clamp jaw 16 moves further away from the base 8 therefore the arrows B move further apart.

Figure 11:
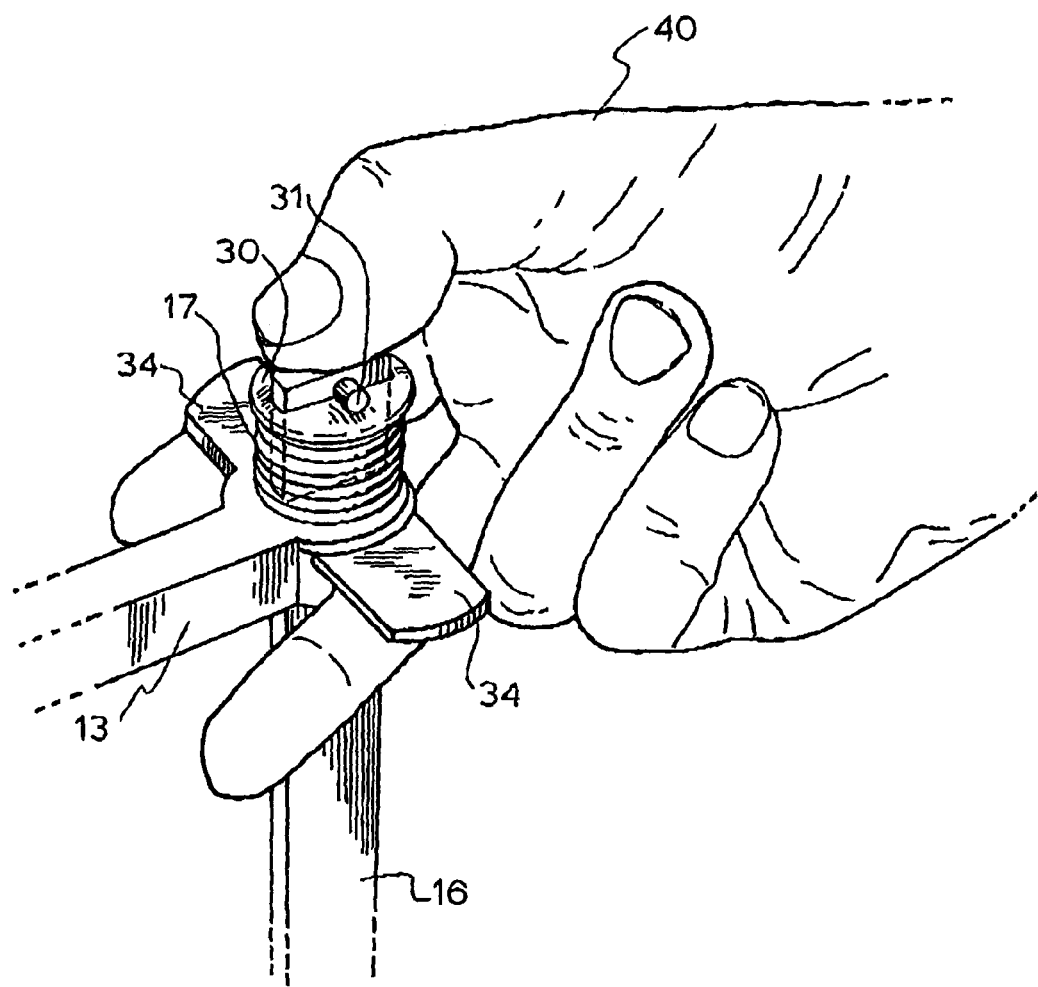
FIG. 11 shows the manual operation of the clamp and clamp spring of FIG. 7 with the spring fully compressed.

In order to facilitate the compression of the spring 17 and to allow the clamp jaw 16 to move in and out relative to the base 8 of the drill press, plates 34 extending from either side of the arm 13 are provided. The plates 34 extend away from the arm 13 a distance which is sufficient to allow the fingers of the user's hand 40 to be comfortably placed under the plates 34. With the user's thumb placed on a top end of the clamp jaw 16 above the cap 30, the spring 17 is compressed as shown in FIG. 11.

Figure 12:
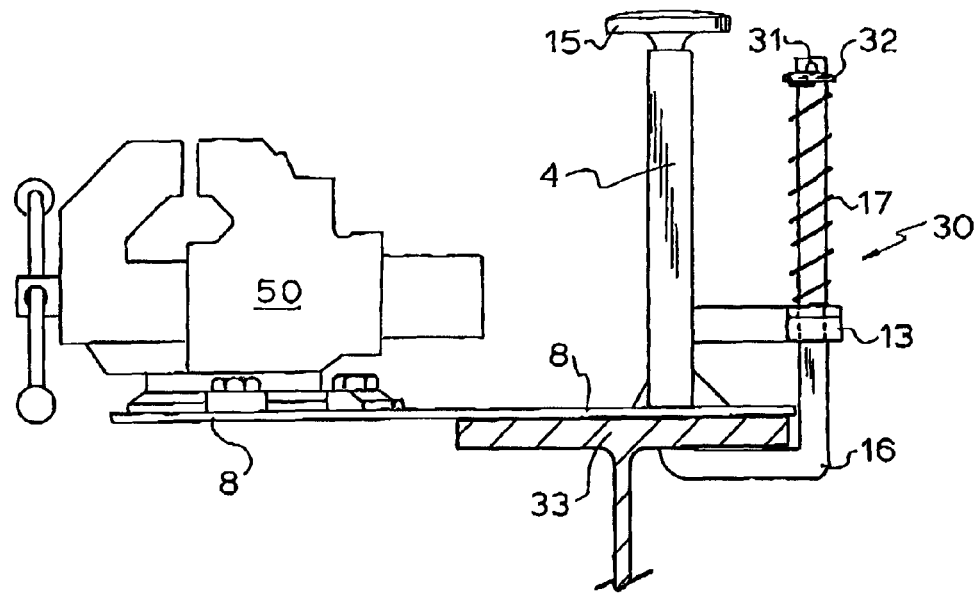
FIG. 12 shows the clamp of FIG. 7 attached to a narrow beam with the drill press removed for clarity and a clamping vice attached to the base.
Figure 13:
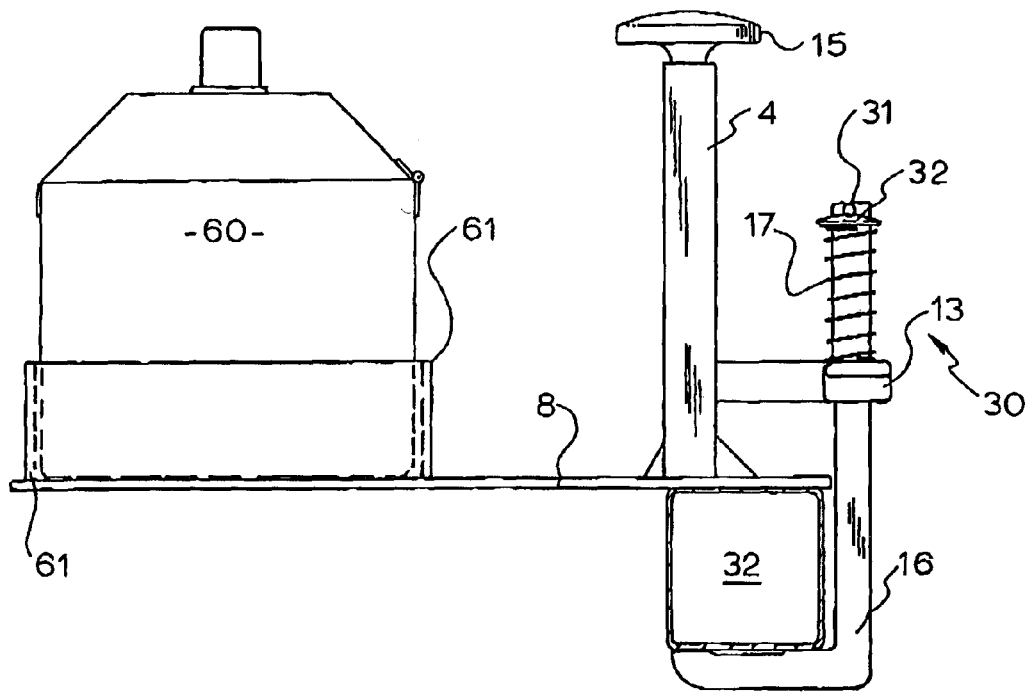
FIG. 13 shows the clamp of FIG. 7 attached to a wide beam with the drill press removed for clarity and a tool box mounted to the base.

FIGS. 12 to 16 show further arrangements and uses of the present invention. In these figures the drill press has been removed for clarity to show these further uses of the clamp 30. In FIG. 12 the base 8 of the drill press is used as a work bench with a vise 50 attached to the base 8. The clamp 30 is attached and secured to a beam 33. FIG. 13 shows a tool box 60 held in a frame 61 which is attached to the base 8. The clamp 30 is attached and secured to a post 32.

Figure 14:
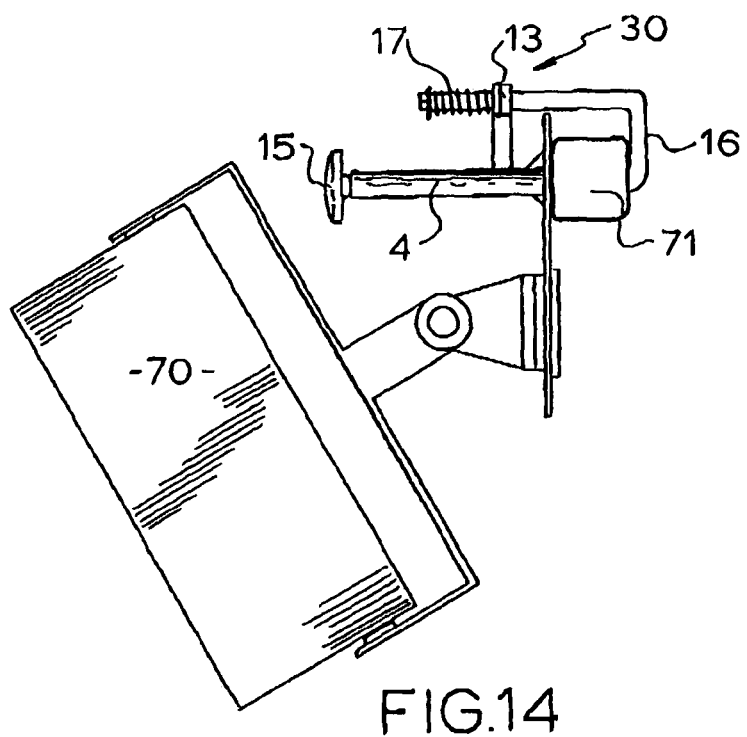
FIG. 14 shows the clamp of FIG. 7 attached to a vertical post with the drill press removed for clarity and a light mounted to the base.
Figure 15:
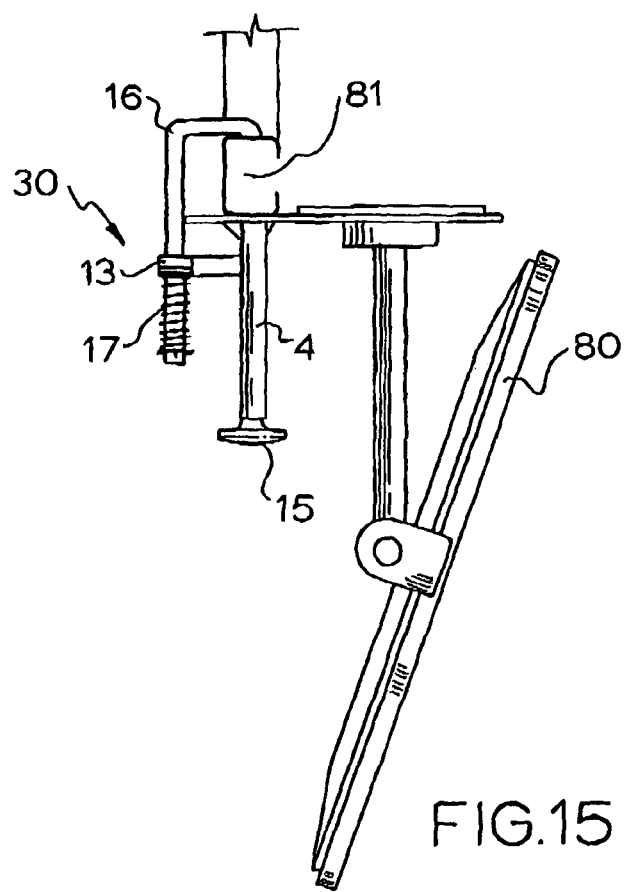
FIG. 15 shows the clamp of FIG. 7 attached to a roof beam with the drill press removed for clarity and a television mounted to the base.

Other uses of the drill press and clamp 30 are illustrated in FIGS. 14 and 15. In FIG. 14 a temporary flood light is attached to the base 8 of the drill press and the clamp 30 is securely attached to the vertical pole 71. In FIG. 15 a flat screen television 80 is attached to the base 8 and the clamp 30 is secured to the roof rafter or beam 81.

Figure 16:
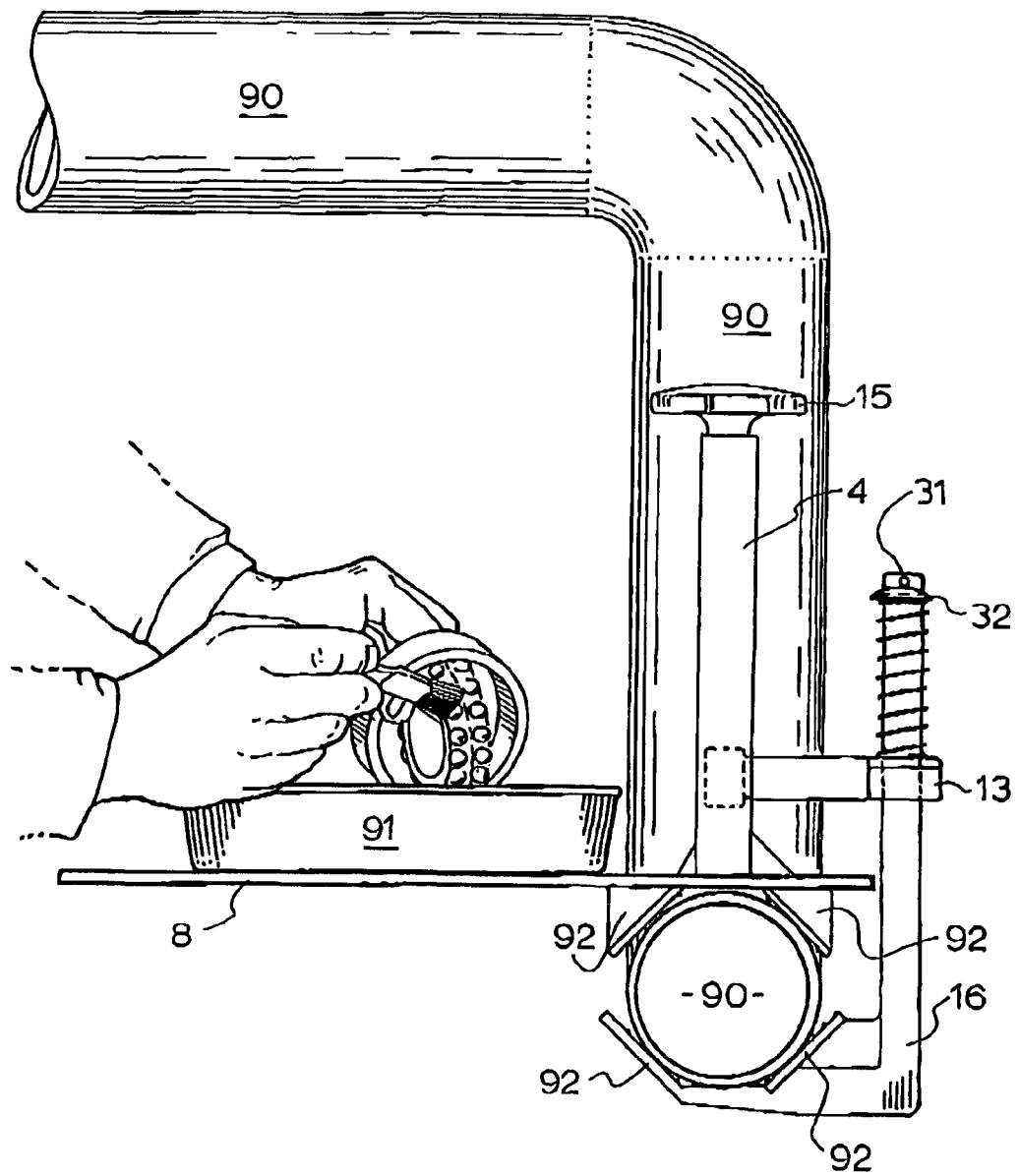
FIG. 16 shows a further embodiment of the clamp which has been adapted to clamp to a pipe in accordance with the present invention.

FIG. 16 illustrates the drill press and modified clamp 30 attached to a pipe system 90 as would be seem in a refinery, pipe line or industrial plant. In this embodiment the base 8 of the drill press is used as a work bench with a cleaning tray 91 placed on top of the base 8. The clamp jaw 16 has been modified to include pipe clamp brackets 92, with the same brackets 92 attached to the underside of the base 8. This allows the clamp 30 to securely attach to any pipe shaped fitting or hollow cylindrical pipe.

Figure 17:
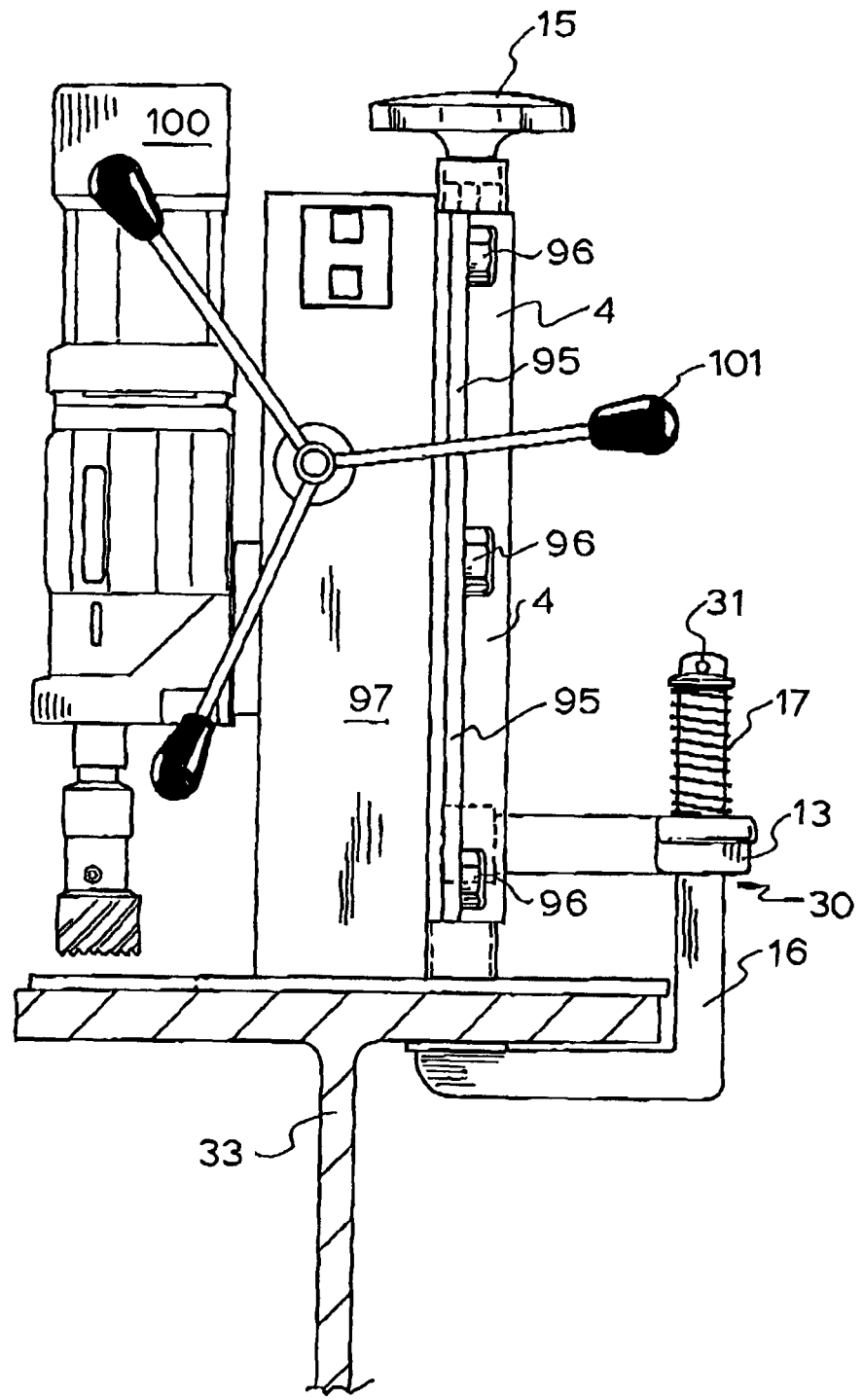
FIG. 17 shows a further embodiment of the portable drill press incorporating the clamp of FIG. 7 in accordance with the present invention.

FIG. 17 illustrates a further embodiment of the present invention with the clamp 30 used with an electromagnetic drill 100 with the electromagnet removed from the drill base and the electromagnetic drill 100 attached to the pillar 4. This allows for the powerful electromagnetic drill to be used in situations where there is little or no metal which can be magnetised. The pillar 4 is held vertically on base 8 and extends upward and perpendicular to the base 8. The pillar 4 houses a threaded shaft 9 and the internal end of clamp arm 13 has an internal thread which engages the thread of the shaft 9 in pillar 4 and moves up and down as handle 15 rotates shaft 9. The external end of arm 13 receives clamp jaw 16 which is slidably restrained on arm 13 by locating spring 17. The clamp jaw 16 is extended to attach to pillar 33 to secure the drill press to the item to be drilled.

The drill press has a set of handles (usually 3) 101 radiating from the housing or central hub 97 that, when turned, move the drill 100 and chuck vertically, parallel to the axis of the pillar 4. Located within housing 97 is a rack and a mating pinion which in conjunction with the handle 101 move the drill and chuck vertically. The housing 97 is secured to the pillar 4 via plate 95 and threaded bolts 96. The plate 95 extends from one side of the pillar 4 and the threaded bolts 96 pass through holes in the plate 95 and are secured in threaded sockets located on the rear side of the housing 97.

Figure 18:
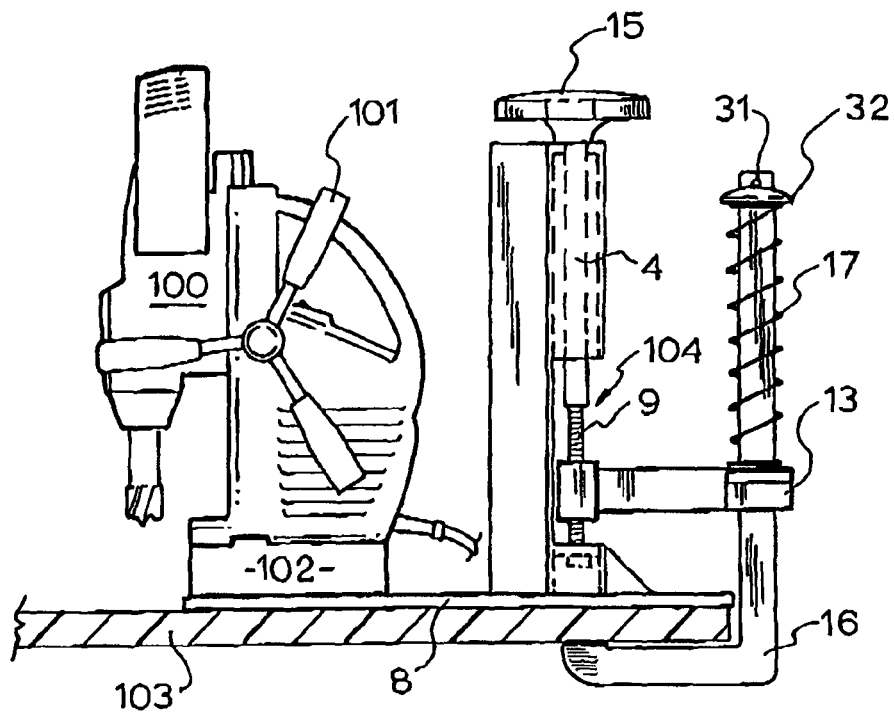
FIG. 18 shows a side view of portable drill press with a clamp in accordance with a further embodiment of the present invention.
Figure 19:
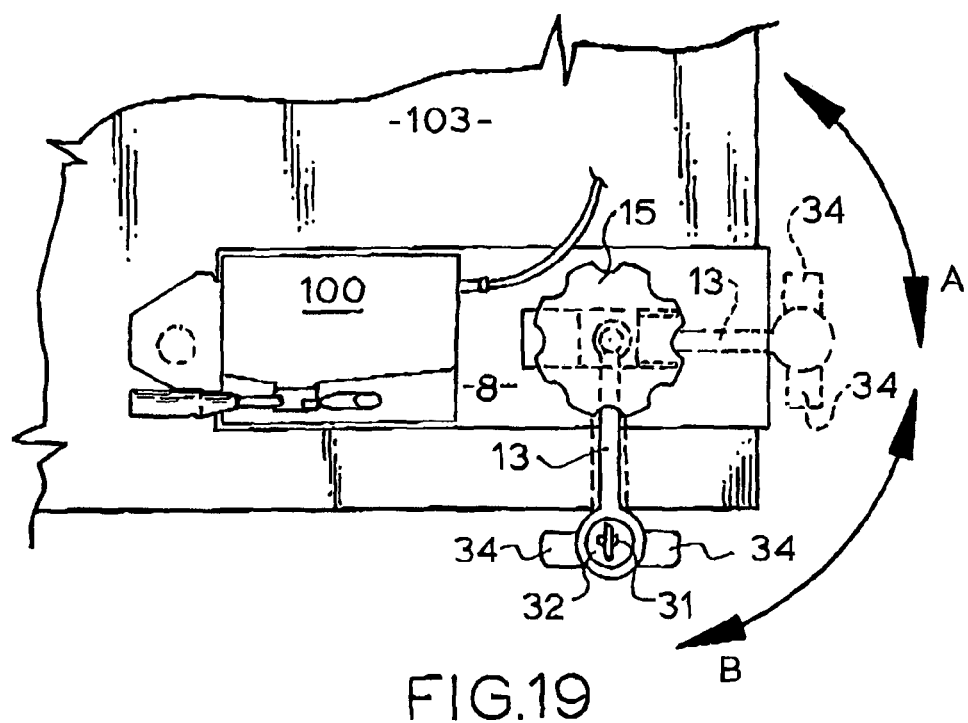
FIG. 19 shows a top view of the portable drill press of FIG. 18.

FIGS. 18 and 19 show a further embodiment in which the drill press and the electromagnetic drill 100 has the electromagnet 102 attached to the drill 100. The electromagnet 102 secures the drill 100 to base 8. The clamp of the present embodiment includes an open section 104 in the pillar 4 which as shown in FIG. 19 allows the clamp to be rotated 180 degrees around the axis extending upward through the centre of the pillar 4. The clamp is secured to a work piece 103 by clamp jaw 16 as has previously been described.

Figure 20:
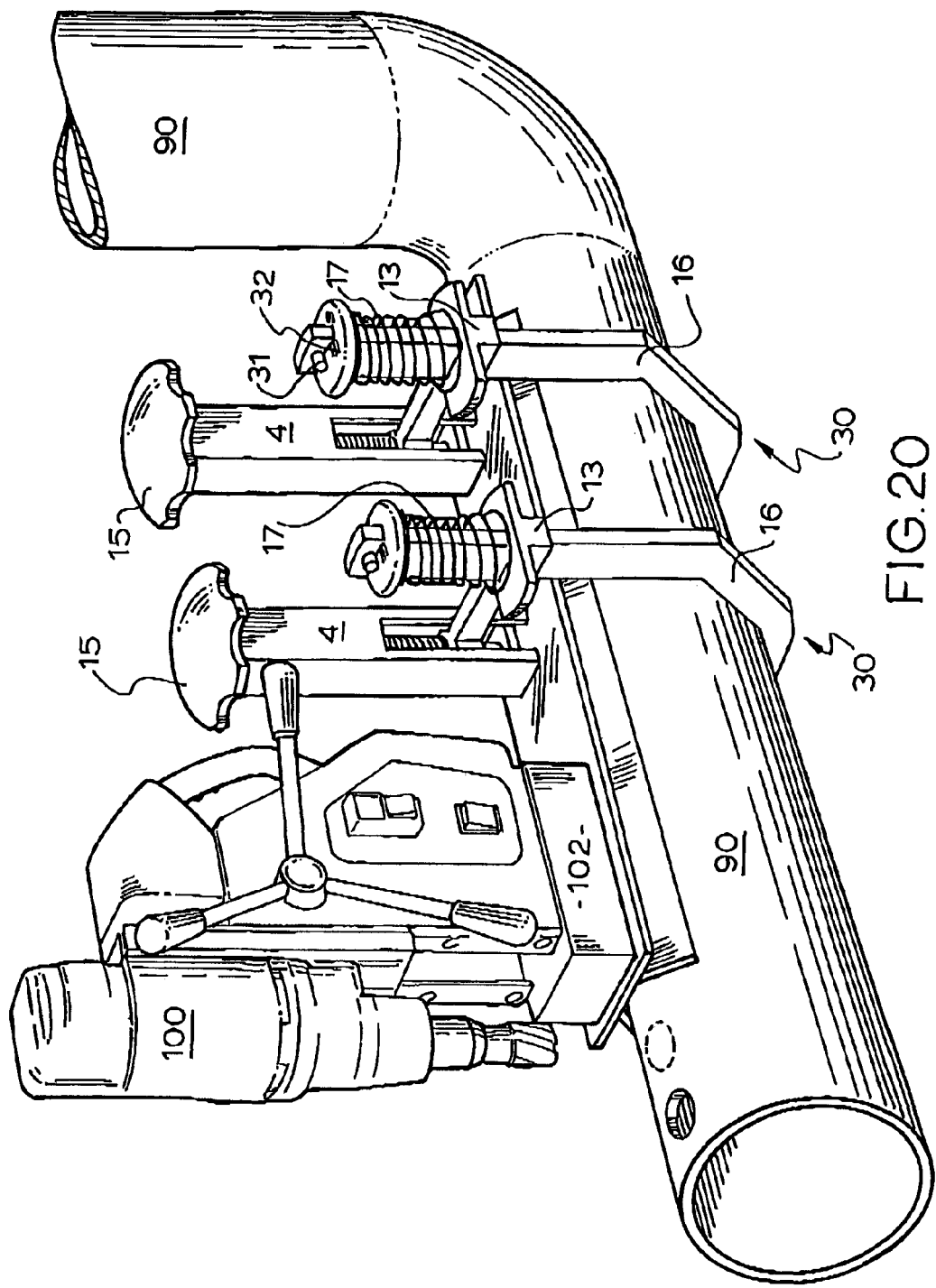
FIG. 20 shows a further embodiment of the present invention in which two clamps have been modified to attach the portable drill press to a pipe.

FIG. 20 illustrates a further embodiment of the present invention in which two clamps 30 are used to secure the drill press and drill 100 to a pipe 90. This embodiment is particularly useful when the pipe is an alloy pipe, stainless steel pipe or poly or plastic pipe or fibrous pipe. In this situation these pipes cannot be magnetised and therefore you would not be able to use the standard electromagnetic drill to easily drill into these pipes. The base of the drill press includes pipe clamp brackets which extend along the underside of the base 8 to assist in securing the drill press to the pipe 90. The clamp jaw 16 is also modified to allow for pipe clamp brackets on the end of the clamp jaw 16 to secure to the underside of the pipe 90. The operation of the two clamps 30 is identical to that described above for one clamp 30.

Figure 21:
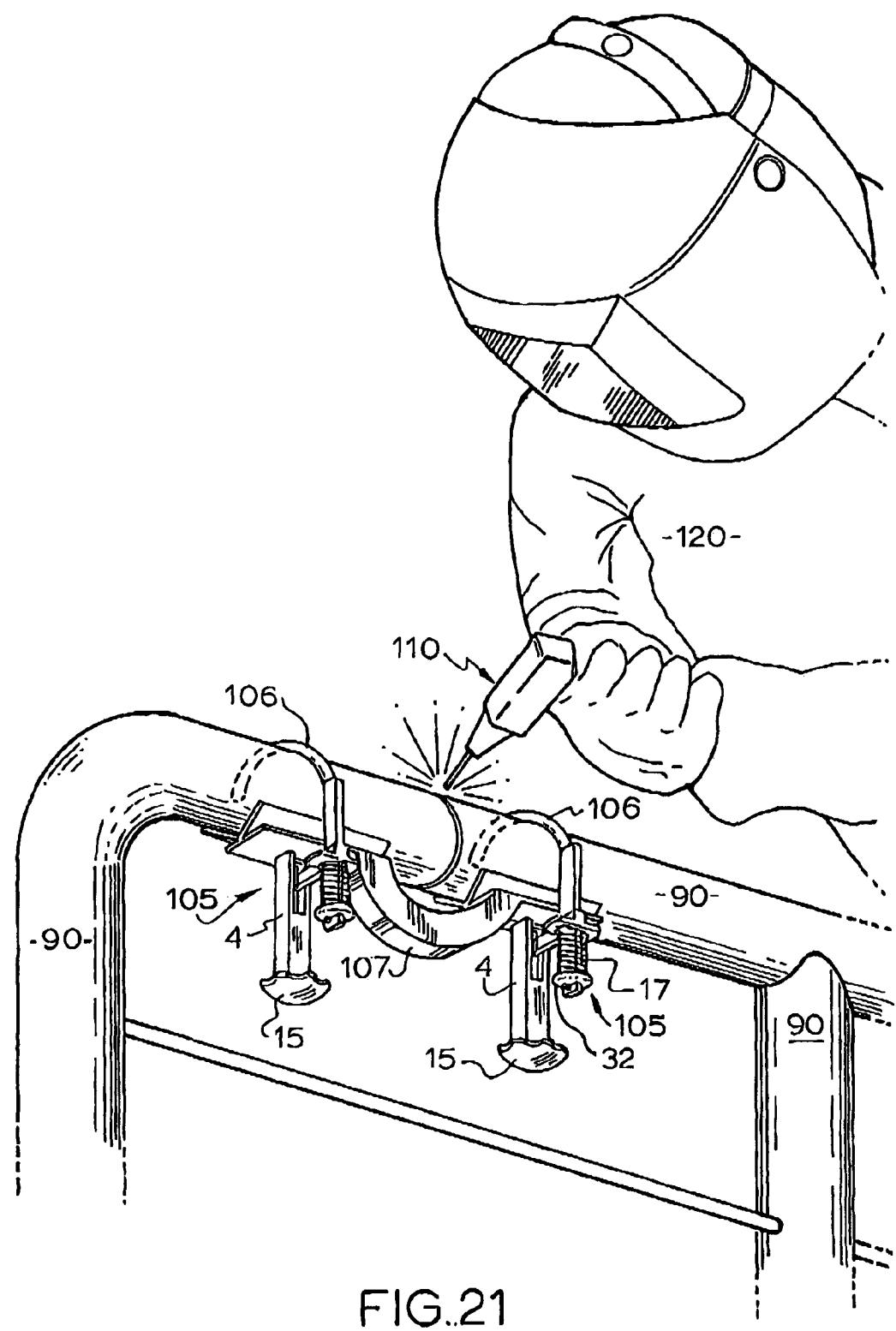
FIG. 21 shows a further embodiment of the present invention in which two clamps with the drill press removed for clarity, the clamps modified to attach to pipes or rails.

FIG. 21 illustrates a further use of the drill press and clamps 105 with the drill press removed for clarity. In this embodiment two modified clamps 105 are used to secure the drill press to a pipe 90 which is to be welded. The two clamps 105 are secured to the pipe 90 by clamp jaw 106 which has a cylindrical end. The two clamps 105 are joined and held together by saddle 107 which ensures that when the pipe is welded by a welder 110 and user 120 the joint to be welded is kept perfectly aligned and square so that the weld formed is parallel with either end of the pipe 90 therefore forming a perfect welded Joint. This type of embodiment is perfect for welding hand rails and large diameter pipes where a clean and perfect weld is required.

Figure 22:
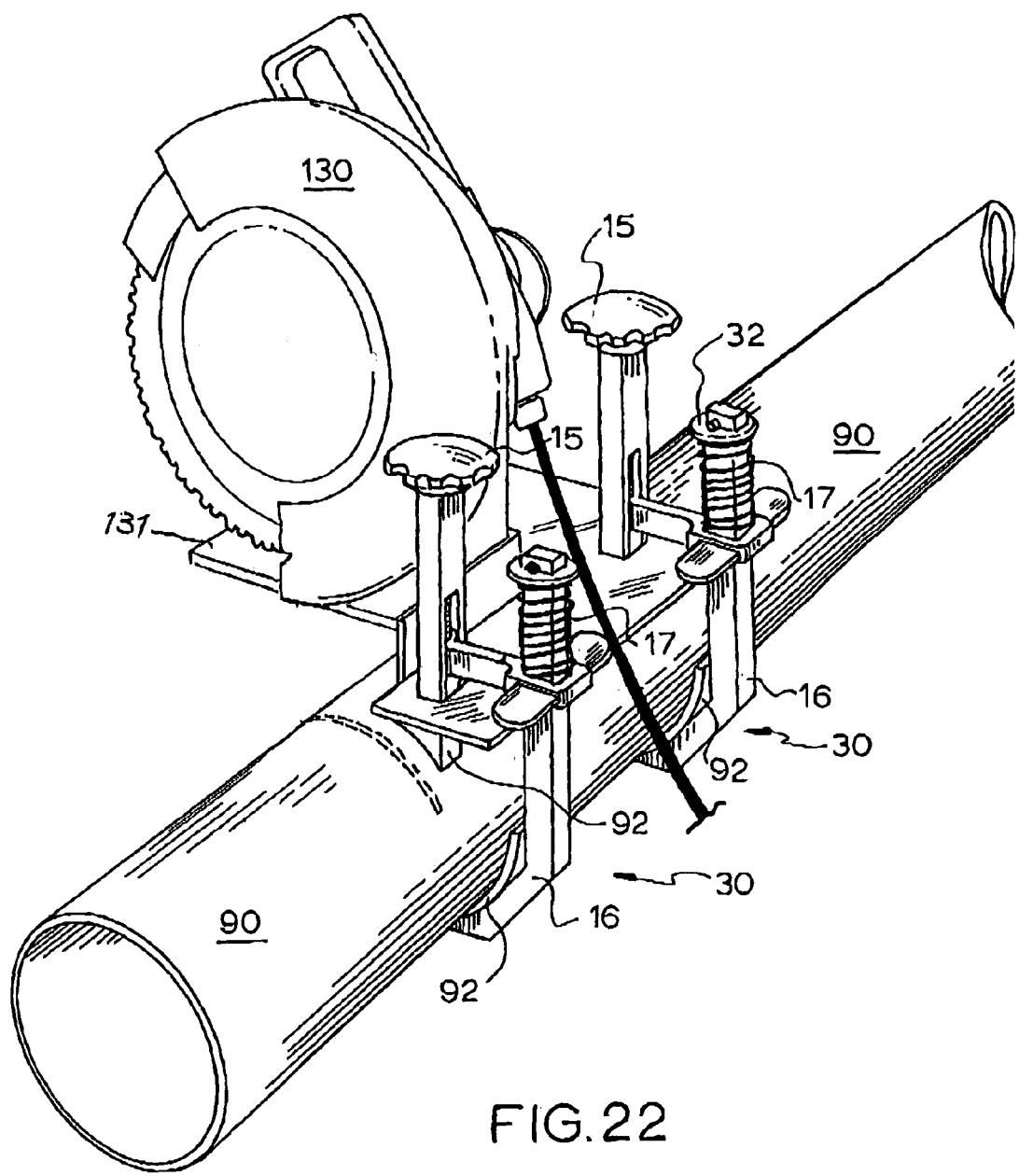
FIG. 22 shows a further embodiment of the present invention in which two clamps have been modified for attachment to a pipe with one clamp having a portable drill press (removed for clarity) and the other clamp having a drop saw attached.

FIG. 22 illustrates a further use of the two clamps 30 in the same configuration as described in FIG. 20. In this embodiment a drop saw 130 is attached to a base 131 at one side and beside one of the clamps 30 and on the other side next to the other clamp 30 is a drill press (removed for clarity). In this embodiment not only can the clamps 30 be used for a drill press but they can also be used to cut items to length without the user having to move to another work bench to complete a job. Both drilling and cutting can be carried out at the same work station or in whatever positions the clamps 30 are attached as previously described in other embodiments of the present invention. In this example the drill press and drop saw 130 are attached to a remote pipe line 90.

The component parts of the drill presses of the above embodiments can be constructed from any light-weight metal or non-metal materials. The only component which has to be constructed from steel is the base 8. In order for the electromagnetic drill 100 to be able to be secured to the base 8 by the electromagnet the base 8 must be a ferrous magnetic material such as steel. By keeping the remaining components of the drill press to light-weight metals or non-metals achieves a drill press which is significantly lighter and portable than most other drill presses.

ADVANTAGES

The present invention provides a number of important advantages over the prior art. Firstly the present invention is considerably lighter in construction than the prior art which is particularly important when the user is working on a roof structure and attempting to drill holes in roof rafters or beams. The drill press must be versatile and light-weight in order for the user to work in places where the work piece cannot be taken to the drill press.

Another advantage with the present invention is that no power is required in order for the drill press to be secured to the work piece. In use an electromagnetic drill requires a power supply to electrically magnetise the base so that the electromagnetic drill can be secured to the workpiece. When working at heights or a distance from a power source, leads must be used to connect the power to the electromagnetic drill. At a work site there is regularly a number of workers on site at any one time, therefore there is always a danger that a power supply can be disconnected and therefore the electromagnetic drill can have power removed inadvertently and this poses a great risk to users. The present invention uses a mechanical clamp to easily secure the drill press to the work piece therefore is much safer and avoids any serious injuries to users and avoid any occupational health and safety issues.

VARIATIONS

It will be realized that the foregoing has been given by way of illustrative example only and that all other modifications and variations as would be apparent to persons skilled in the art are deemed to fall within the broad scope and ambit of the invention as herein set forth. Throughout the description and claims to this specification the word "comprise" and variation of that word such as "comprises" and "comprising" are not intended to exclude other additives components integers or steps.

The invention claimed is:

1. A drill press comprising a hollow pillar with a base, a holder for a drill slidably mounted on the pillar and a clamp with a jaw held by an arm which engages a threaded shaft housed in the pillar and configured to raise and lower the arm and the jaw accordingly, wherein the clamp is used for clamping the base to a work piece so that the drill is guided to the work piece, the arm and jaw are rotatable about a longitudinal axis of the pillar, and wherein the jaw is slidably restrained on the arm.

2. The drill press of claim 1 wherein the clamp is an F clamp, a G clamp or a C clamp.

3. The drill press of claim 1 wherein a pinion rotatable by a lever is pivoted in a housing and engages a rack formed on an outer surface of the pillar so that rotating the lever urges the drill vertically towards or away from the work piece.

4. The drill press of claim 1, wherein a spring is located on either side of the arm to restrain movement of the jaw.

5. The drill press of claim 1, wherein a spring is located on one side of the arm to restrain movement of the jaw.

6. The drill press of claim 1 wherein the arm engages the threaded shaft such that movement of the shaft raises and lowers the arm and the jaw accordingly.

7. The drill press of claim 6, wherein the arm has an internal thread which engages a screw thread of the shaft located within the pillar of the drill press so that rotating the screw thread raises and lowers the arm and the jaw accordingly.

8. The drill press of claim 7, wherein the arm protrudes through an opening in one side of the pillar, the opening being of sufficient size to allow the arm to move up or down to secure or release the clamp with a jaw to a work piece.

9. The drill press of claim 8, wherein the opening in the pillar allows the clamp with a jaw to rotate through an arc located either side of an axis passing vertically through the centre of the pillar.

10. The drill press of claim 7, wherein the pillar further comprises an opening which allows the clamp with a jaw to rotate through an arc of 180 degrees with respect to an axis passing vertically through the centre of the pillar.

11. The drill press of claim 1, wherein the clamp with a jaw can be withdrawn upwards into the pillar through a slot in the base so that the base can sit flush on a surface.

12. The drill press of claim 7 wherein the threaded shaft is moved by rotating a handle protruding at the top of the pillar to allow the arm to move up and down to secure the clamp with a jaw to a work piece.

13. The drill press of claim 3, wherein the pinion and rack are both located within the housing with the housing being attached to at least one side of the pillar, at least one lever extending externally of the housing to engage and rotate the pinion to move the holder for the drill and therefore the drill vertically towards and away from the work piece.

14. The drill press of claim 1, wherein the drill comprises any one of:
   (i) an electric drill;
   (ii) an hydraulic drill;
   (iii) a pneumatic drill; or
   (iv) an electromagnetic drill.

15. The drill press of claim 14, wherein the electromagnetic drill is either mounted using the electromagnet to the base of the drill press or the electromagnetic drill may be mounted to the holder attached to at least one side of the pillar.

16. The drill press of claim 1, wherein the drill press comprises:
   at least two hollow pillars mounted on a base;
   at least two clamps each with a jaw held by an arm which engage a threaded shaft housed in each of the pillars sand configured to raise and lower the arm and the jaw independently within each pillar; and
   wherein each clamp is used for clamping the base to a work piece.

17. The drill press of claim 16, wherein the drill press contains any one of:
   (i) a drill; and/or
   (ii) a drop saw, and
   wherein the at least two pillars and clamps further comprise a bridge or saddle located between and joining the at least two pillars and clamps.

18. The drill press of claim 1, wherein the base of the drill press further includes an opening in the base which allows the drill to pass through the opening and drill into the work piece clamped to the base of the drill press.

19. The drill press of claim 5, wherein the drill press further comprises plates protruding and extending from either side of the arm a distance which is sufficient to allow the fingers of the user's hand to be comfortably placed under the plates and with the user's thumb placed on a top end of the clamp the user is allowed to compress the spring to allow the clamp with a jaw to move in and out relative to the base of the drill press.

20. The drill press of claim 1, wherein the jaw of the clamp may further comprise brackets mounted to an end of the jaw to facilitate the attachment of the jaw of the clamp to a pipe or cylindrical work piece.

* * * * *